United States Patent [19]

Kumamoto et al.

[11] Patent Number: 4,568,794
[45] Date of Patent: Feb. 4, 1986

[54] GAP TYPE ACSR CONDUCTOR WITH SUPPORTING STRUCTURE AND METHOD OF FORMING SAME

[75] Inventors: Norikatsu Kumamoto; Hideaki Miyazaki, both of Osaka, Japan

[73] Assignee: Sumitomo Electric Industries, Ltd., Osaka, Japan

[21] Appl. No.: 633,788

[22] Filed: Jul. 24, 1984

[30] Foreign Application Priority Data

Aug. 3, 1983 [JP] Japan ............................ 58-121459[U]

[51] Int. Cl.⁴ .............................................. H02G 7/05
[52] U.S. Cl. ................................ 174/40 R; 29/419 R; 248/63
[58] Field of Search ............... 174/40 R, 42, DIG. 12; 24/122.6; 29/419 R, 461; 248/63, 64

[56] References Cited

U.S. PATENT DOCUMENTS 3,007,243 11/1961 Peterson ........................... 174/42 X

FOREIGN PATENT DOCUMENTS 864361 1/1941 France ................................. 248/63
467781 6/1937 United Kingdom ................. 248/63

Primary Examiner—Laramie E. Askin
Attorney, Agent, or Firm—Ernest A. Beutler

[57] ABSTRACT

An improved method for suspending a gap type steel reinforced aluminum conductor is proposed. A sleeve is mounted on the conductor and compressed so that there will be no gap between the conductive strands and the core. When compressed, grooves are formed in the outer periphery of the sleeve. Armor rods are wound around the sleeve in the grooves. The conductor is then clamped in a suspension clamp.

4 Claims, 7 Drawing Figures

GAP TYPE ACSR CONDUCTOR WITH SUPPORTING STRUCTURE AND METHOD OF FORMING SAME

The present invention relates to a method and arrangement for supporting a gap type steel reinforced aluminum conductor (hereinafter called the gap type ACSR) which is known as one of the conductors for overhead power transmission lines.

As shown in FIG. 1, a gap type ACSR comprises a conductor 1 consisting of trapezoidal wires or strands 1a of aluminum alloy and round wires or strands 1b of aluminum alloy, both in a tubular layer, and a core 1c of steel strands mounted on the center of a compartment formed by the wires 1a and 1b with some gap left. This type of conductor has many advantages: the sag of the conductor with temperature rise depends only on the coefficient of liner expansion of the steel core; the current capacity is larger in comparison with an ordinary ASCR; it has an aeolian vibration damping capacity by the action of the steel core hitting against the inner wall of the conductor layer.

This type of ASCR has so far been suspended in such a manner as shown in FIG. 2. Firstly, armor rods 2 are wound around the conductor 1. The conductor is then set in a suspension clamp 3 and its armored portions are clamped with braces 4 by tightening bolts. At the central portion of the clamp 3, the not-armored portion of the conductor is directly clamped with braces 5 so that there will be no gap between the conductive strands and the core. This direct clamping heavily deforms the aluminum conductive strands. Since the conductor is compressed between the braces 5 and the clamp body, the conductor tends to expand sidewise without being uniformly deformed. Some of the conductive strands particularly acted upon by compressive stress might have decreased sectional area and thus decreased mechanical strength. Therefore, such conductive strands might be broken by repetition of aeolian vibrations.

In accordance with the present invention, a sleeve is mounted on a gap type ACSR and compressed against the conductor with a die having a corrugated inner surface so that there will be no gap between the aluminum conductive strands and the steel core and so that grooves for armor rods are formed in the outer periphery of the sleeve. Armor rods are then wound around the conductor in the grooves formed in the sleeve and the armor-covered conductor is clamped in a suspension clamp.

Since pressure is applied uniformly to the conductor through the sleeve mounted thereon, this conductor is uniformly deformed to a reduced diameter without any reduction in the sectional diameter and thus the mechanical strength of the aluminum strands. Further, since the conductive strands are protected by armor rods wound continuously, they will be under no bending stress or frictional force in the suspension clamp. Therefore, the possibility of the aluminum strands being broken is eliminated.

One advantage of the present invention is that the aluminum conductive strands are not liable to breakage due to aeolian vibrations because they are not deformed so much.

It is an object of the present invention to provide a method and arrangement for suspending a gap type ACSR.

Other objects and features of the present invention will become apparent from the following description taken with reference to the accompanying drawings, in which.

Figure 3:
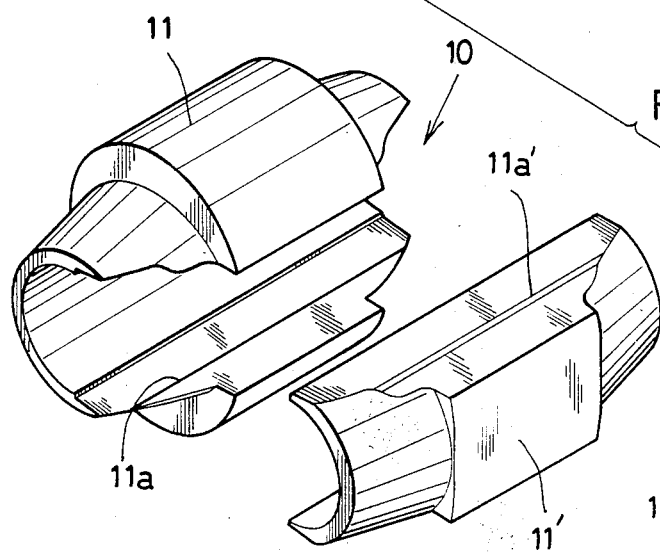
FIG. 3 is a perspective view of an example of a sleeve used in the present invention.
Figure 4:
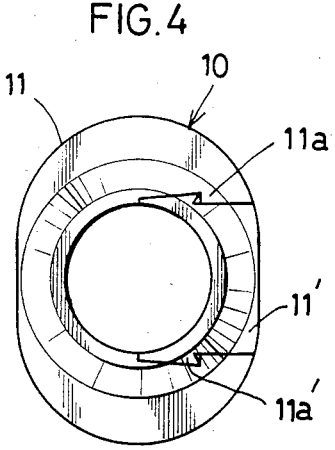
FIG. 4 is a front view thereof.

FIGS. 3 and 4 show an example of a sleeve used in the supporting structure in accordance with the present invention. This sleeve 10 is made of aluminum or its alloy and cast so as to be thick at its central portion and gradually become thinner toward its ends. Also, the sleeve is axially split into two sections 11, 11' for easy attachment on a conductor. The sections 11, 11' are each formed with an engaging portion 11a, 11a', respectively, extending in an axial direction so that the sections fit tightly together. The sleeve may be of a one-unit structure. But, it should preferably be formed of two sections for greater convenience in attachment on the conductor, in view of the fact that the conductor is suspended at a point far away from the dead-end tower.

It will be described how the supporting structure of the present invention is assembled. The sleeve 10 is first mounted on the conductor 1. A die (not shown) of a split structure and having a corrugated inner surface is then mounted on the sleeve 10. The conductor with the sleeve mounted thereon is compressed by means of a suitable means such as a hand press until there will be no gap between the aluminum conductive strands and the steel core 1c.

Figure 6:
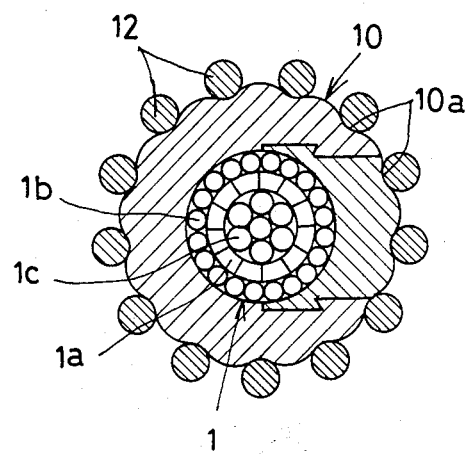
FIG. 6 is a sectional view taken along the line VI—VI of FIG. 5.
Figure 7:
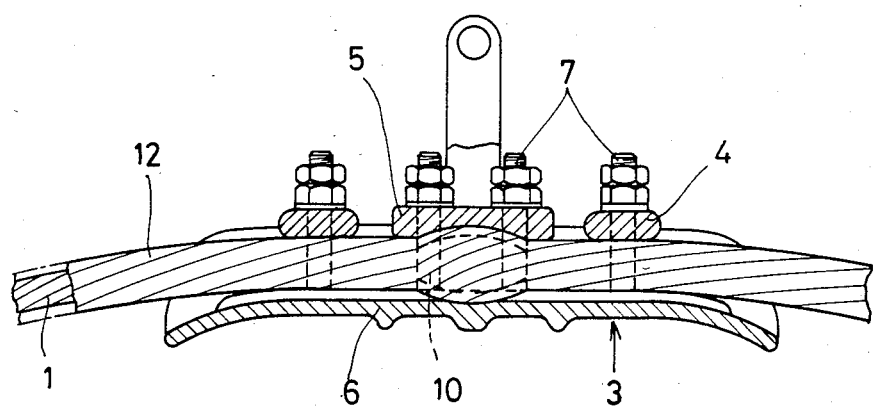
FIG. 7 is a vertically sectional side view showing the supporting structure according to the present invention.

Now, a plurality of grooves 10a have been formed by compression on the outer periphery of the sleeve 10 to receive the armor rods at a required angle at which the armor rods are to be wound (FIG. 6). The conductor 1 has been uniformly deformed into a condition shown in FIG. 6 with no gap between the aluminum conductive strands 1a and the core 1c. The sleeve 10 has been tightly secured on the core through the aluminum conductive strands.

Figure 5:
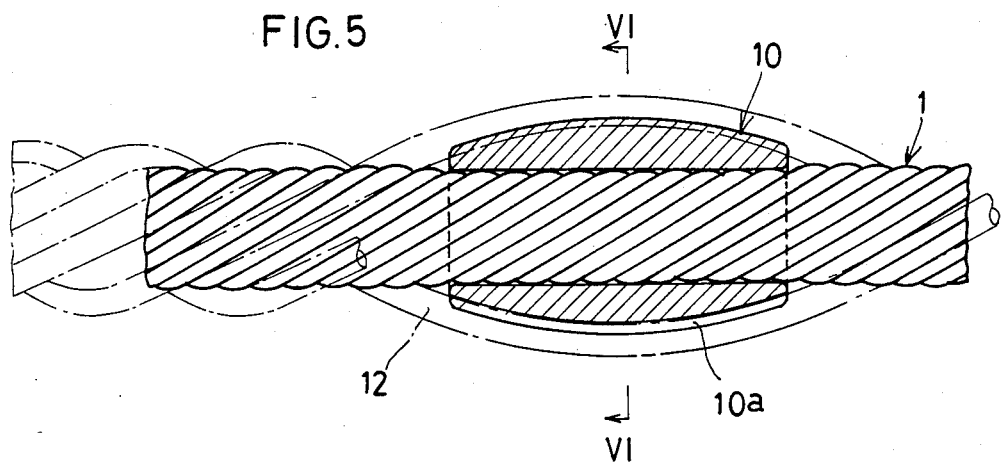
FIG. 5 is a sectional side view of the sleeve mounted on a cable.

After the sleeve 10 has been compressed on the conductor, preformed armour rods 12 are wound around the conductor in the grooves 10a at a portion to be clamped to protect the conductor (FIGS. 5 and 6). Then, the armored portion is set in a suspension clamp 3 and bolts 7 are tightened to clamp the armored conductor with braces 4 and 5.

Figure 1:
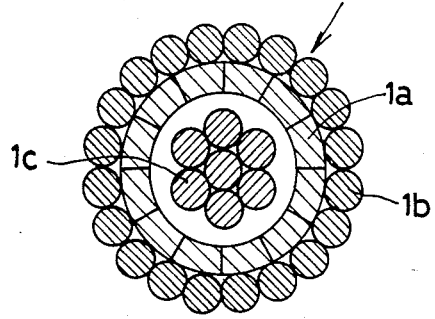
FIG. 1 is a sectional view of a prior art gap type ACSR.
Figure 2:
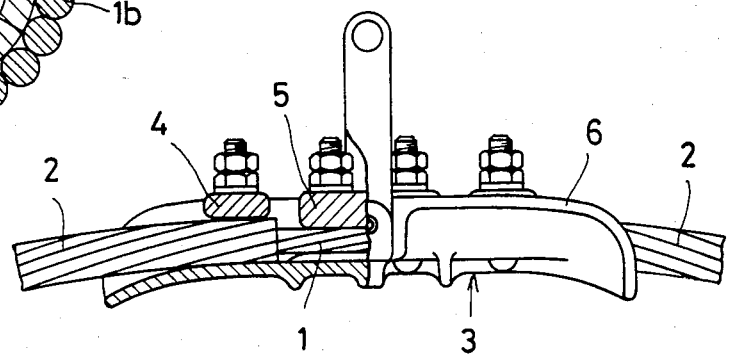
FIG. 2 is a partially cutaway side view of a conventional arrangement for suspending a gap type ACSR.

Although in the conventional arrangement shown in FIG. 2 the braces 4 are essential, they may be omitted in the arrangement of the present invention because the braces 5 clamp the conductive together with the armor rods.

What is claimed is:

1. A method for suspending a gap type steel reinforced aluminum conductor having aluminum conductive strands and a steel core, comprising the steps of mounting a sleeve on the conductor, mounting on said sleeve a die having its inner surface corrugated, compressing said die against said sleeve and said conductor so that there will be no gap between said aluminum conductive strands and said steel core and so that said sleeve is formed in its outer periphery with grooves for armor rods, winding armor rods around said sleeve on said conductor in said grooves, and clamping the armored conductor in a suspension clamp.

2. A method as claimed in claim 1, wherein the sleeve is axially split into at least two sections before mounting on the conductor, said sections being fitted together tightly and allowing the conductor to be compressed upon compression by the die.

3. A gap type steel reinforced aluminum conductor having aluminum conductive strands and a steel core and an associated supporting structure, comprising a sleeve mounted on said conductor and compressed around its circumference sufficiently so that there will be no gap between said aluminum conductive strands and said steel core in the area where said sleeve engages said conductor, said sleeve being formed in its outer periphery with a plurality of grooves formed by the compression, a plurality of armor rods wound around said sleeve in said grooves and on said conductor, and a suspension clamp clamping said conductor together with said sleeve and said armor rods.

4. The combination as claimed in claim 3, wherein said sleeve is axially split into at least two sections, said sections being fitted together tightly and compressing the conductor.

* * * * *